(12) United States Patent
Shrestha et al.

(10) Patent No.: US 11,418,074 B2
(45) Date of Patent: Aug. 16, 2022

(54) ROTARY ELECTRICAL MACHINE WITH SPOKED ROTOR

(71) Applicant: ABB Schweiz AG, Baden (CH)

(72) Inventors: Ghanshyam Shrestha, Cary, NC (US); Colin Tschida, Durham, NC (US); William E. Martin, Greenville, SC (US); Paul Humphries, Market Drayton (GB)

(73) Assignee: ABB Schweiz AG, Baden (CH)

( * ) Notice: Subject to any disclaimer, the term of this patent is extended or adjusted under 35 U.S.C. 154(b) by 587 days.

(21) Appl. No.: 16/035,171

(22) Filed: Jul. 13, 2018

(65) Prior Publication Data
US 2020/0021154 A1 Jan. 16, 2020

(51) Int. Cl.
| H02K 1/28 | (2006.01) |
| H02K 1/27 | (2022.01) |
| H02K 1/276 | (2022.01) |
| H02K 15/03 | (2006.01) |

(52) U.S. Cl.
CPC ............ *H02K 1/2773* (2013.01); *H02K 1/28* (2013.01); *H02K 15/03* (2013.01)

(58) Field of Classification Search
CPC ........... H02K 1/2773; H02K 1/27; H02K 1/28
See application file for complete search history.

(56) References Cited

U.S. PATENT DOCUMENTS

| 4,036,080 A * | 7/1977 | Friedericy ............... F16C 15/00 |
| | | 74/572.11 |
| 4,445,062 A * | 4/1984 | Glaser .................. H02K 1/2773 |
| | | 310/156.59 |
| 6,175,177 B1 * | 1/2001 | Sabinski .............. H02K 1/2773 |
| | | 310/156.55 |

(Continued)

FOREIGN PATENT DOCUMENTS

| AU | 2017202163 A1 | 10/2017 |
| CN | 104254963 A | 12/2014 |

(Continued)

OTHER PUBLICATIONS

English machine translation, Gilles et al. WO2012164519A1 (Year: 2012).*

*Primary Examiner* — Burton S Mullins
(74) *Attorney, Agent, or Firm* — Leydig, Voit & Mayer, Ltd.

(57) ABSTRACT

A rotor assembly includes a rotor member and a plurality of permanent magnets. The rotor member has a hub with a central axis and a plurality of spokes extending radially outward relative to the hub. Each spoke has a radially inward end and a radially outward end. Each spoke also has a body section, a mounting section, and a flux barrier section. The body section extends from the radially outward end towards the radially inward end. The mounting section is interconnected to the hub. The flux barrier section is disposed between the body section and the mounting section and has at least one flux restriction web extending between the body (Continued)

section and the mounting section. The flux restriction web magnetically isolates the body section from the mounting section. A permanent magnet is disposed within each magnet-receiving slot between pairs of adjacent spokes. A motor with the rotor assembly is also disclosed.

18 Claims, 11 Drawing Sheets

(56) References Cited

U.S. PATENT DOCUMENTS

| | | | | |
|---|---|---|---|---|
| 7,772,735 B2* | 8/2010 | Nishiura | ............... | H02K 1/2773 |
| | | | | 310/156.56 |
| 8,729,767 B2* | 5/2014 | Feuerrohr | ............ | H02K 1/2773 |
| | | | | 310/216.074 |
| 9,083,226 B2* | 7/2015 | Li | ......................... | H02K 1/2773 |
| 9,343,934 B2* | 5/2016 | Zhao | ................... | H02K 1/2773 |
| 9,590,459 B2 | 3/2017 | Hoemann | | |
| 9,837,881 B2* | 12/2017 | Schneider | ............ | H02K 1/2773 |
| 10,199,892 B2* | 2/2019 | Ekin | .................... | H02K 1/2773 |
| 10,693,336 B2* | 6/2020 | Deng | ........................ | H02K 3/18 |
| 11,088,579 B2* | 8/2021 | Michaelides | ........ | H02K 1/2773 |
| 2011/0121668 A1* | 5/2011 | Condamin | ............ | H02K 1/2773 |
| | | | | 310/51 |
| 2013/0057103 A1* | 3/2013 | Han | ...................... | H02K 1/2773 |
| | | | | 310/156.12 |
| 2015/0380998 A1 | 12/2015 | Hoemann | | |
| 2016/0006303 A1 | 1/2016 | Hoemann et al. | | |
| 2017/0288486 A1 | 10/2017 | Hoemann et al. | | |
| 2018/0226850 A1* | 8/2018 | Kim | ....................... | H02K 15/03 |

FOREIGN PATENT DOCUMENTS

| | | | | |
|---|---|---|---|---|
| CN | 104685765 A | | 6/2015 | |
| DE | 102005047771 | * | 4/2007 | ............... H02K 1/27 |
| DE | 102009045101 | * | 4/2011 | ............... H02K 1/27 |
| EP | 3410573 | * | 12/2018 | ............... H02K 1/27 |
| GB | 724389 A | | 2/1955 | |
| WO | WO2012164519 A1 | * | 12/2012 | ........... H02K 1/2773 |
| WO | WO 2018/005544 A1 | | 1/2018 | |
| WO | WO2018219390 A1 | * | 12/2018 | ........... H02K 1/2773 |

* cited by examiner

ROTARY ELECTRICAL MACHINE WITH SPOKED ROTOR

TECHNICAL FIELD

The present disclosure relates generally to a rotary electrical machine or motor and, more particularly, to a spoked rotor having a magnetic flux barrier section for use with such a rotary electrical machine or motor.

BACKGROUND

Rotary electric machines or motors include a fixed stator and a rotor configured for rotation within the stator. Some such rotary electric machines utilize permanent magnets that are mounted or disposed on the rotor. In one configuration, the permanent magnets are disposed on the outer circumference of the rotor. In another configuration, the rotor includes a plurality of spokes that extend radially outward from a centrally located hub. Permanent magnets are disposed in slots between adjacent spokes.

Rotary electric machines having spokes and permanent magnets therebetween typically are relatively large. In one configuration, rare earth permanent magnets may be utilized to reduce the size of the rotary electric machine. However, such rare earth permanent magnets are substantially more expensive than those made of ferrite material. In addition, rotary electric machines having spokes and permanent magnets therebetween may also require relatively complex construction including magnetically insulative components to reduce leakage of magnetic flux between poles.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a rotor assembly for a permanent magnet motor includes a rotor member and a plurality of permanent magnets. The rotor member has a hub with a central axis and a plurality of spokes extending radially outward relative to the hub. Pairs of adjacent spokes define a magnet-receiving slot therebetween. Each spoke has a radially inward end and a radially outward end, with the radially inward end being closer to the central axis than the radially outward end. Each spoke also has a body section, a mounting section, and a flux barrier section. The body section extends from the radially outward end towards the radially inward end. The mounting section is interconnected to the hub. The flux barrier section is disposed between the body section and the mounting section and has at least one flux restriction web extending between the body section and the mounting section. The flux restriction web is configured to magnetically isolate the body section from the mounting section. One of the plurality of permanent magnets is disposed within each magnet-receiving slot.

In another aspect, a motor includes a stator assembly, a rotor assembly, and a shaft. The rotor assembly includes a rotor member and a plurality of permanent magnets. The rotor member has a hub with a central axis and a plurality of spokes extending radially outward relative to the hub. Pairs of adjacent spokes define a magnet-receiving slot therebetween. Each spoke has a radially inward end and a radially outward end, with the radially inward end being closer to the central axis than the radially outward end. Each spoke also has a body section, a mounting section, and a flux barrier section. The body section extends from the radially outward end towards the radially inward end. The mounting section is interconnected to the hub. The flux barrier section is disposed between the body section and the mounting section and has at least one flux restriction web extending between the body section and the mounting section. The flux restriction web is configured to magnetically isolate the body section from the mounting section. One of the plurality of permanent magnets is disposed within each magnet-receiving slot. The shaft is mounted on and extends through the hub of the rotor assembly.

DETAILED DESCRIPTION

Figure 1:
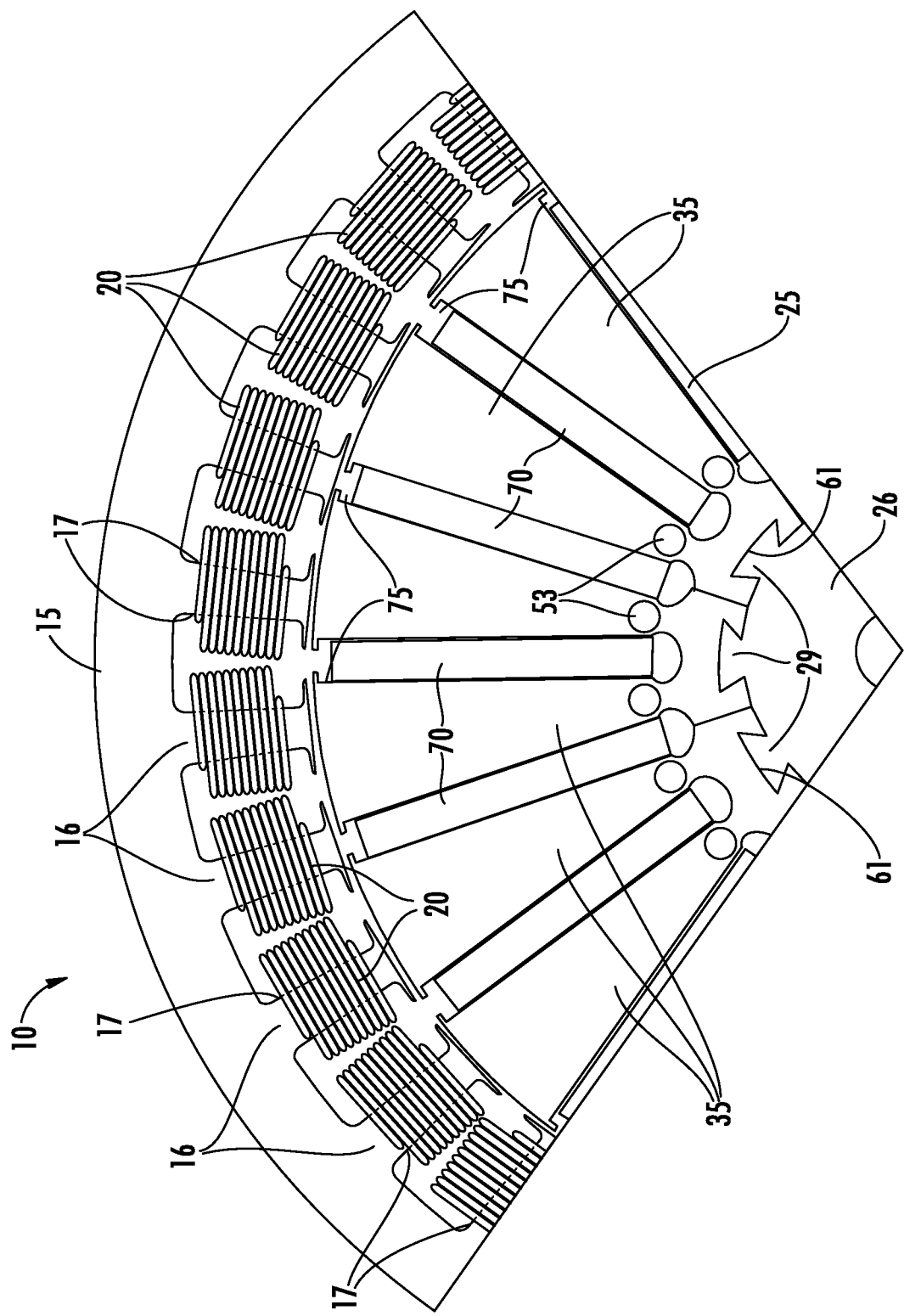
FIG. 1 is a fragmented end view of a rotary electric machine in accordance with the disclosure.

Referring to FIG. 1, a rotary electric machine such as a permanent magnet motor 10 is depicted. Permanent magnet motor 10 includes a stator assembly 15 and a rotor assembly 25 that is rotatable relative to the stator. Stator assembly 15 has a generally annular shape with a plurality of stator poles 16 projecting radially inward. Side edges 17 of adjacent stator poles 16 define stator slots into which coils or windings of conductive wires may be positioned. As depicted, a concentrated coil or winding 20 is wrapped around each stator pole 16 so that a portion of each coil is positioned within the slots on opposite sides of the stator pole. The coil 20 only partially fills the stator slot to provide space for a coil wrapped around an adjacent stator pole 16. In other embodiments, the stator assembly 15 may be configured with distributed coils or windings in which the wires are wrapped around a plurality of stator poles 16.

In one embodiment, the stator assembly 15 may be formed from a stack of a plurality of relatively thin layers of a magnetically conductive material such as silicon or electrical steel that are laminated or otherwise secured together. Other configurations and constructions are contemplated.

Figure 2:
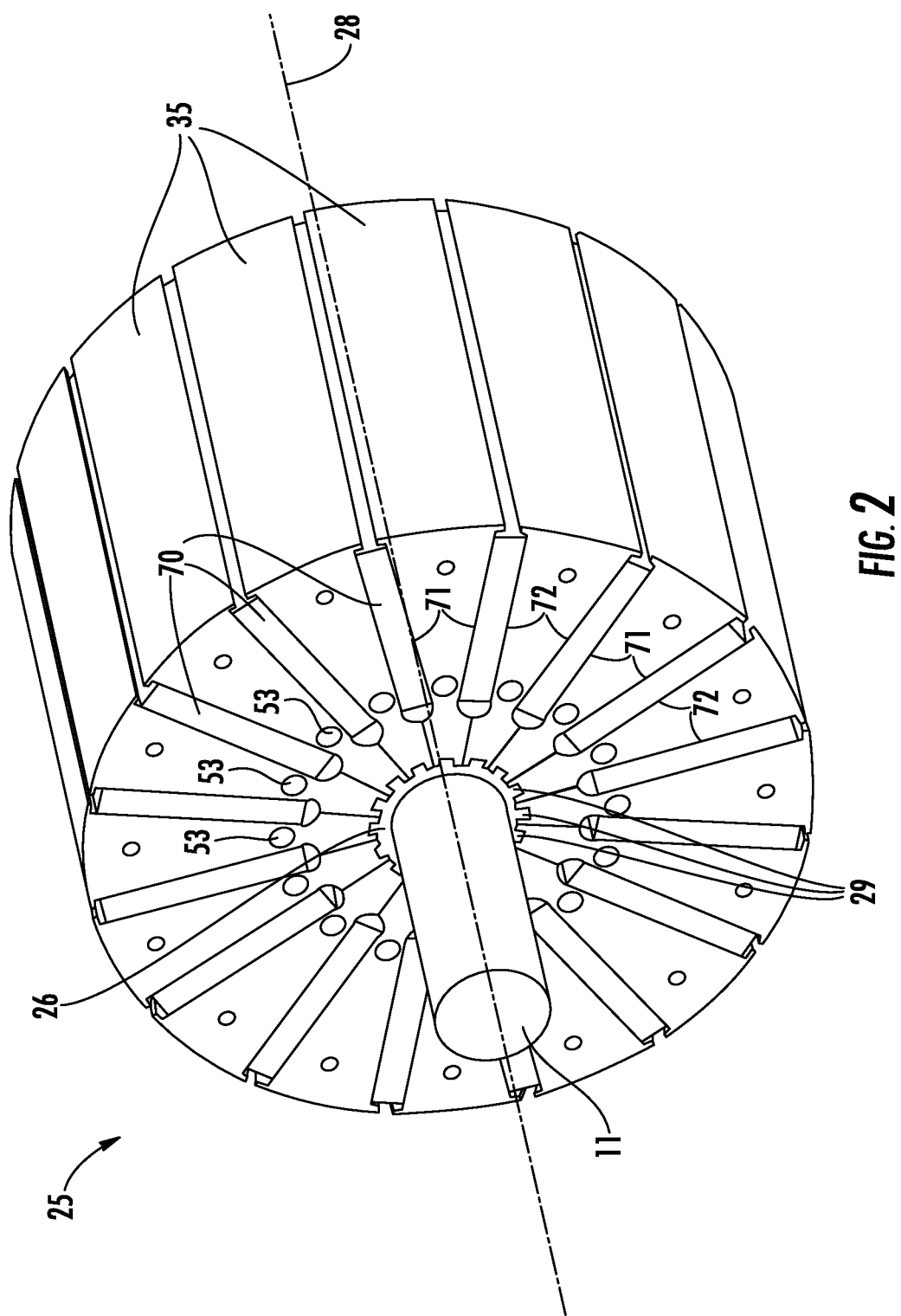
FIG. 2 is perspective view of the rotor assembly of the rotary electric machine of FIG. 1.
Figure 3:
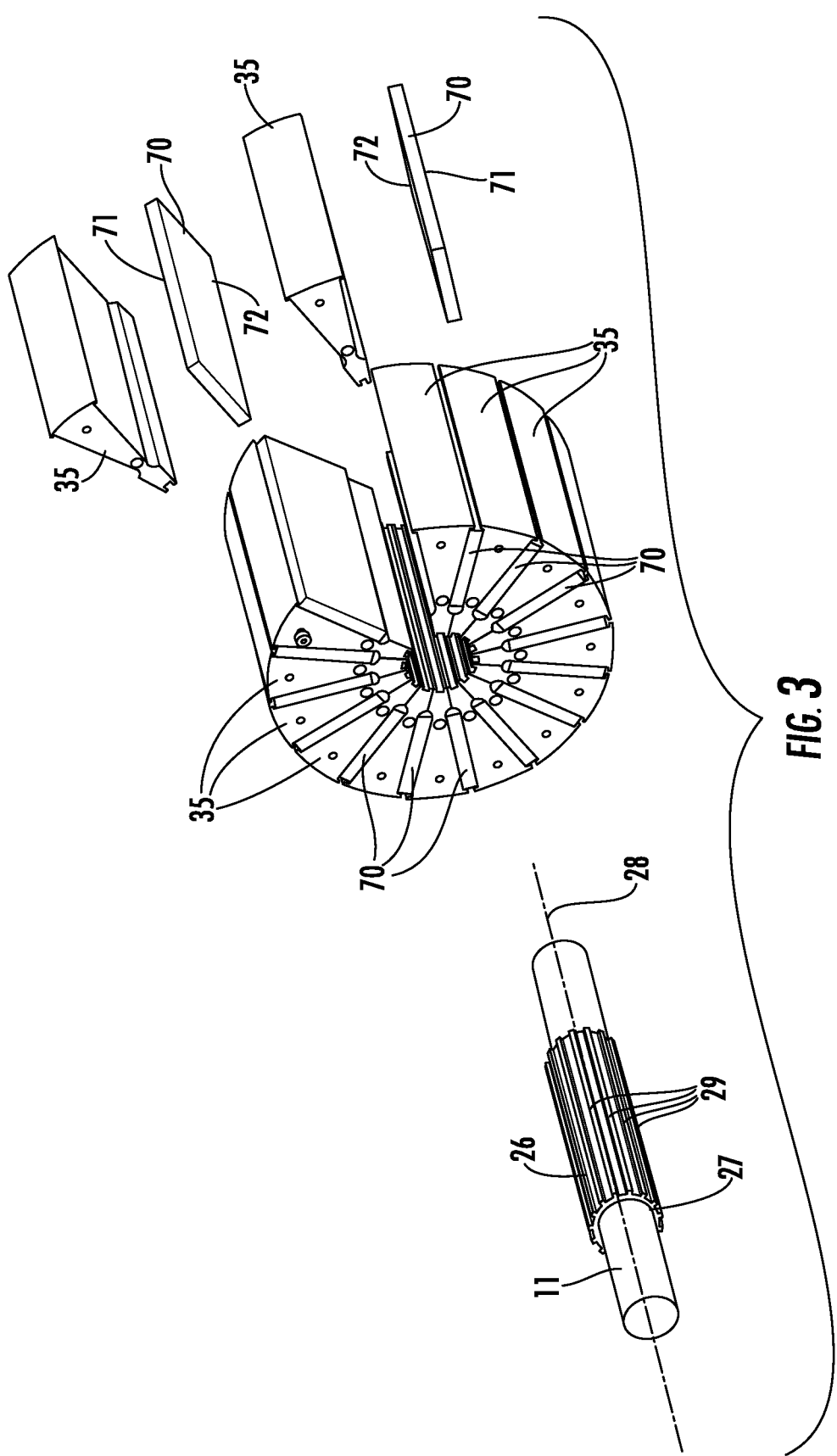
FIG. 3 is a partially exploded perspective view of the rotor assembly of FIG. 2.

Referring to FIGS. 2-3, the rotor assembly 25 includes a central hub 26 with a plurality of spokes 35 projecting radially outward from the hub and a magnet 70 positioned in the magnet-receiving slots 75 between each pair of adjacent spokes. The hub 26 is generally annularly shaped with a central cavity 27 configured to receive a shaft 11 along a central axis 28 of the hub. In another embodiment, the shaft 11 and hub 26 may be integrally formed together as a one-piece member.

A plurality of locking projections or members 29 that may function as splines or keys are positioned in a spaced apart manner along the outer surface of the hub 26. In one configuration, the locking projections 29 have a dovetail shape or configuration. Other configurations are contemplated. The hub 26 may be formed of any desired material. In one embodiment, the hub 26 may be formed of a magnetically conductive material such as steel.

Figure 5:
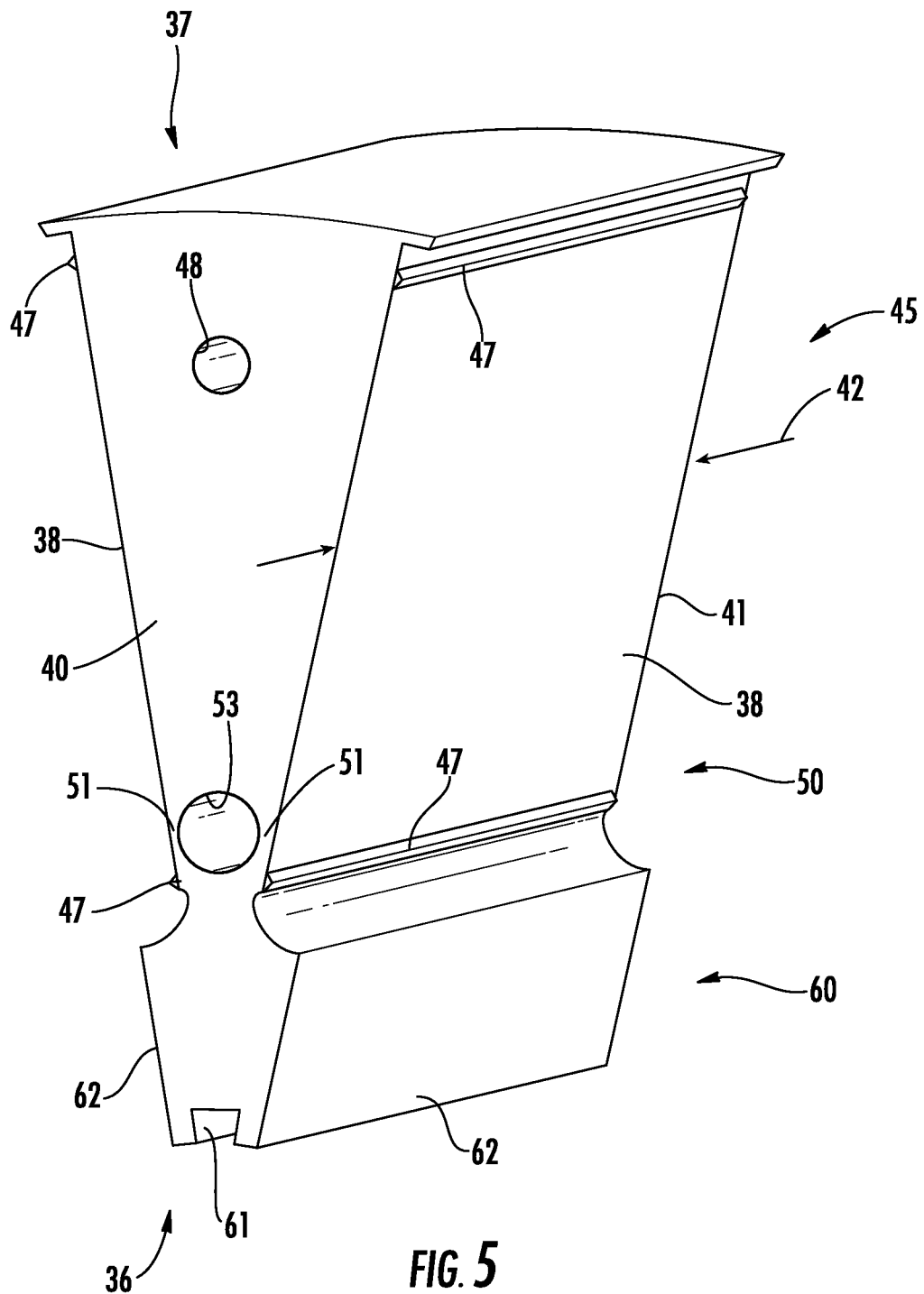
FIG. 5 is a perspective view of one of the spokes of FIG. 4.

Each of the spokes 35 is configured as a generally elongated trapezoidal cuboid having a radially inward end 36 adjacent the hub 26 and an opposite radially outward end 37. Oppositely facing side edges or walls 38 extend from the radially inward end 36 to the radially outward end 37. Referring to FIG. 5, each of the spokes 35 has a constant thickness 42 between a first face 40 and a second opposite face 41. As referred to herein, the width 43 of a spoke 35 is the distance between the oppositely facing side edges 38 and varies or changes between the radially inward end 36 and the radially outward end 37.

Each of the spokes 35 has a body section 45, a flux barrier or isolation section 50, and a mounting section 60. The body section 45 extends radially inward from the radially outward end 37 towards the radially inward end 36. The flux barrier section 50 is positioned between and interconnects the body section 45 and the mounting section 60 and is configured to magnetically isolate the body section 45 from the mounting section 60. The mounting section 60 extends radially outward from the radially inward end 36 towards the radially outward end 37 and is positioned adjacent and interconnected to the hub 26.

The body section 45 of each spoke 35 is a generally elongated trapezoidal cuboid that is wider at the radially outward end 37. If desired, projections 46 may extend generally circumferentially outward from each side edge 38 at the radially outward end 37 to close to some extent the magnet-receiving slots 75. Magnet alignment tabs or projections 47 may extend outward from each side edge 38 to radially position a magnet 70 relative to each spoke 35. As depicted, one of the magnet alignment tabs 47 is positioned generally adjacent the radially outward end 37 of the spoke and a second magnet alignment tab 47 is positioned adjacent the flux barrier section 50. If desired, a hole 48 may be disposed in or extend through the body section 45 generally near the radially outward end 37 for manufacturing purposes.

Figure 4:
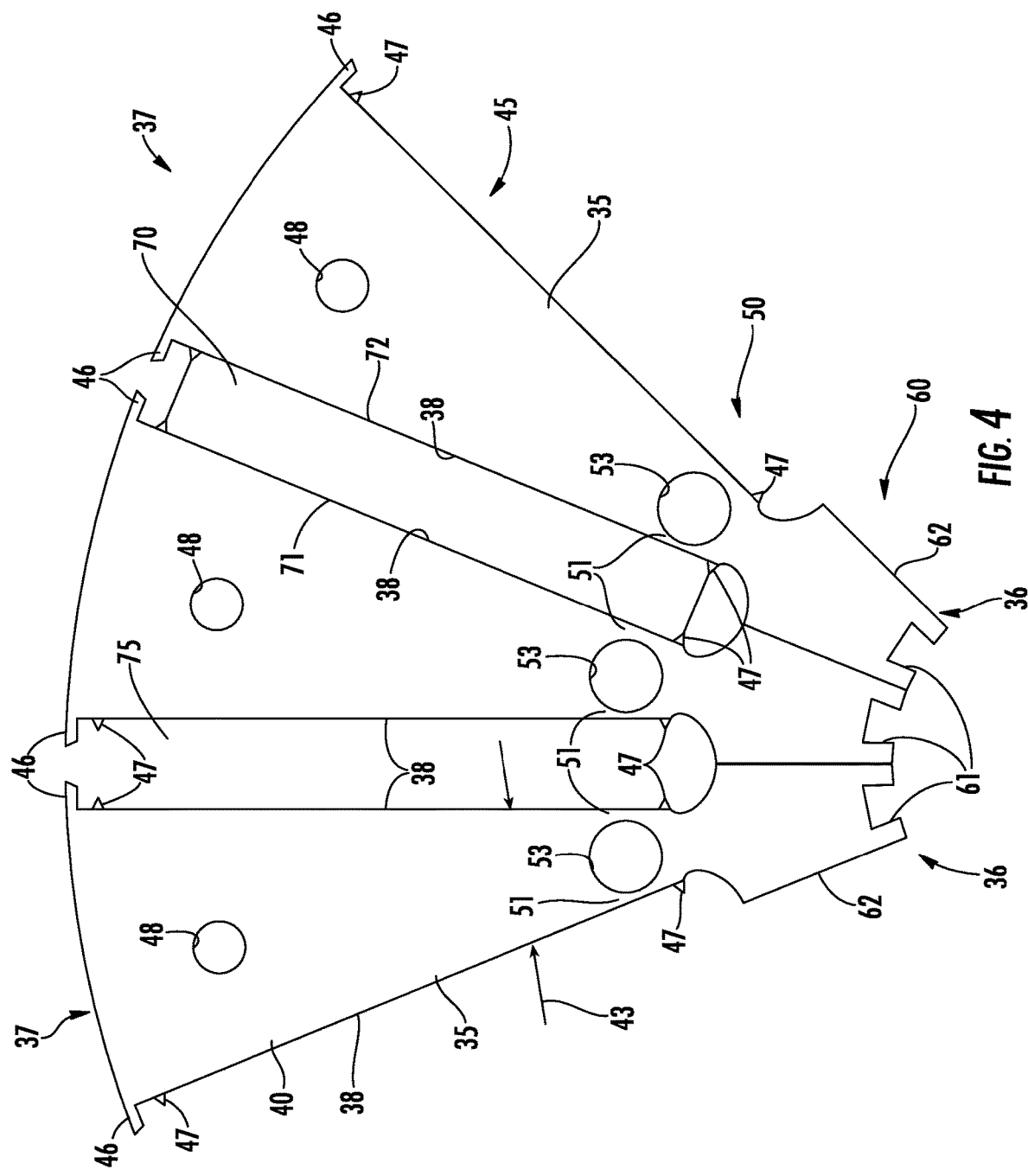
FIG. 4 is an end view of three spokes of the rotor assembly of FIG. 2.
Figure 6:
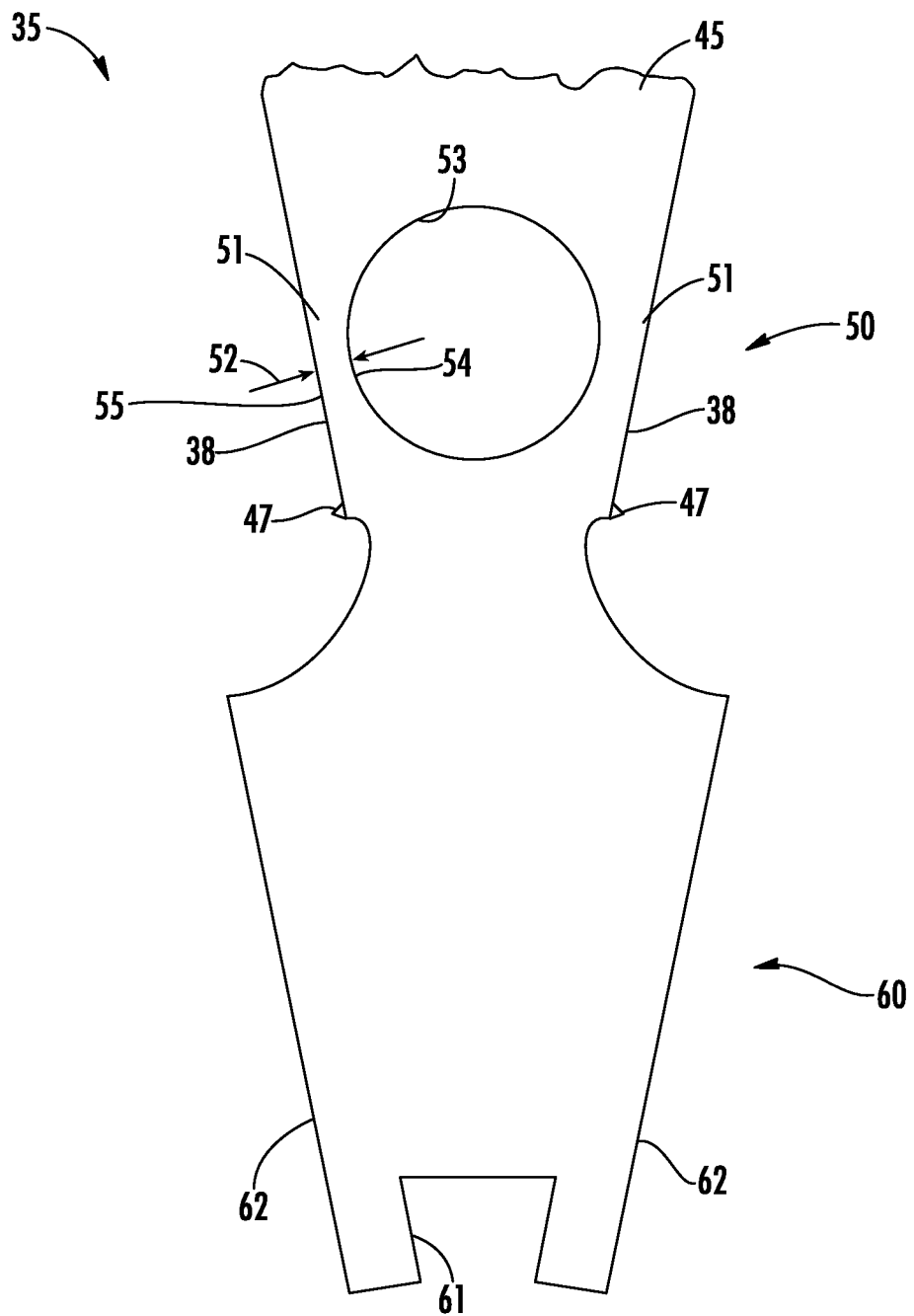
FIG. 6 is an enlarged fragmented end view of the radially inward end of the spoke of FIG. 5.

The flux barrier section 50 of each spoke 35 includes at least one flux restriction web 51, 56, 58 extending between the body section 45 and the mounting section 60. Referring to FIGS. 4-6, the flux barrier section 50 includes a pair of spaced apart flux restriction webs 51 that extend along the side edges 38 of the spoke 35. The flux restriction webs 51 have a relatively narrow width 52 or are relatively narrow in a direction transverse to the thickness 42 between the first and second faces 40, 41 of the spoke 35. In an embodiment, the flux barrier section 50 has a circular flux barrier opening 53 centered between the side edges 38 to define the inner edge 54 of each flux restriction web 51. The outer edge 55 of each flux restriction web 51 is defined by a side edge 38 of the spoke 35.

The flux restriction webs 51 are configured to be narrow enough to effectively restrict the flow of magnetic flux from the body section 45 and the magnet 70 to the mounting section 60 and thus to adjacent spokes 35 and magnets while being wide enough to provide sufficient structural rigidity and strength to support the spoke during rotational operation of the rotor assembly 25. To operate as a flux barrier, it is desirable for the flux restriction webs 51 to be narrow enough so that the magnetic flux is saturated at the flux restriction webs which prevents or inhibits the flow of flux through the webs. As a result of saturation of the flux restriction webs 51, the flux restriction webs act as a barrier or obstacle to the magnetic flux so that the vast majority of the magnetic flux will be forced or directed radially outward towards the outward end 37 of the spoke 35 and thus towards the stator assembly 15 to improve the efficiency of the operation of the motor 10.

Inasmuch as the size of the rotor assembly 25 may vary significantly, the width of the flux restriction webs 51 may vary depending upon the configuration of the motor 10. While it may be desirable for the flux restriction webs 51 to be as narrow as possible in order to limit the flow of magnetic flux, the size and configuration of the rotor may require an increase in the width 52 of the flux restriction webs. In other words, for a relatively small rotor assembly 25, a flux restriction web 51 having a very narrow width 52 may provide sufficient structural rigidity and strength to the spoke 35. For a relatively large rotor assembly 25, it may be necessary to configure the flux restriction web 51 having a wider width 52.

In one embodiment, the flux restriction webs 51 may have a width 52 between 0.3 and 2.0 mm. In another embodiment, the flux restriction webs 51 may have a width between 0.3 and 3.0 mm. In still another embodiment, the flux restriction webs 51 may have a width between 0.3 and 4.0 mm.

Figure 7:
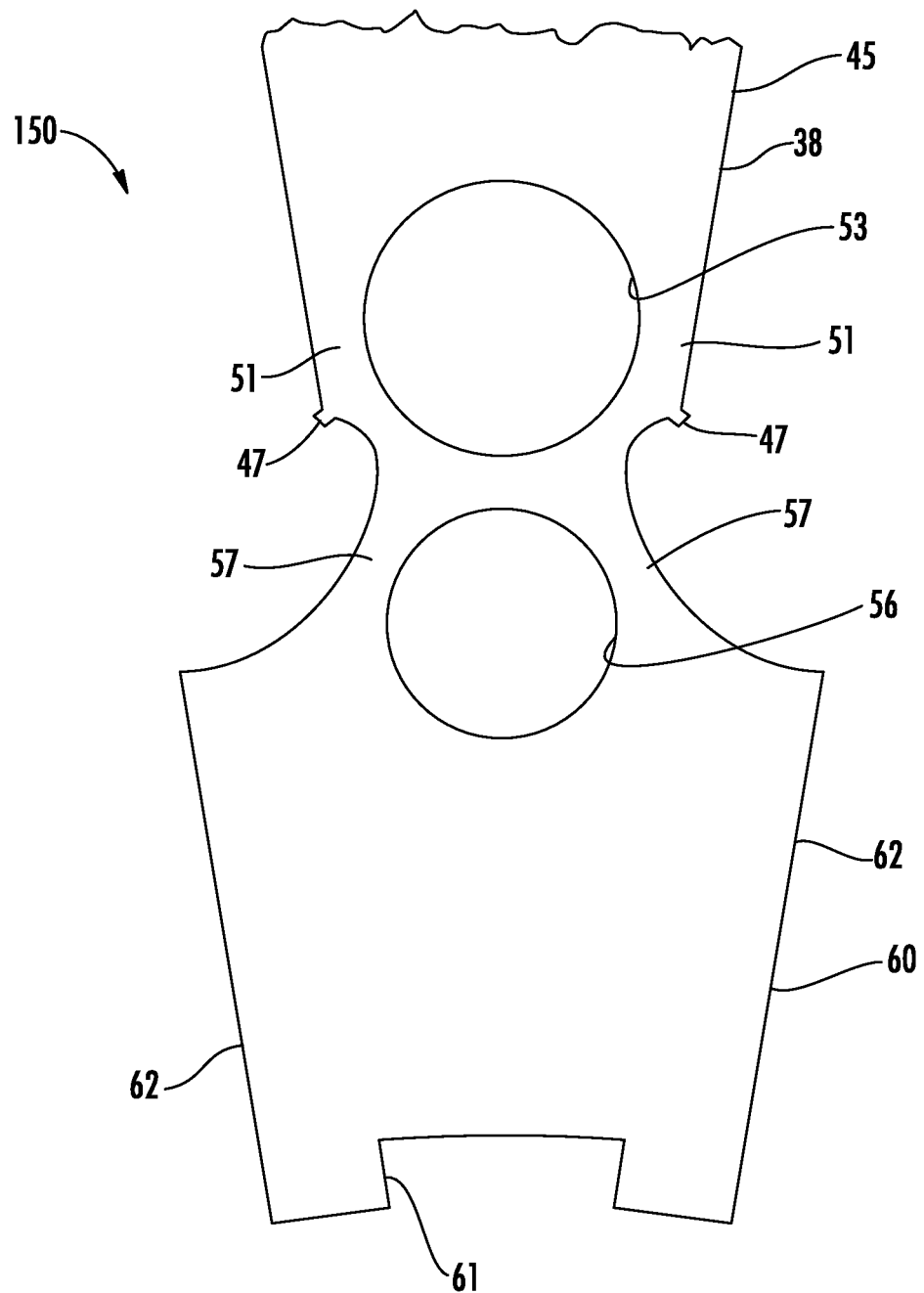
FIG. 7 is an enlarged fragmented end view of the radially inward end of an alternate embodiment of a spoke.

Although depicted with a pair of flux restriction webs 51, other configurations of the flux barrier section 50 are contemplated. For example, as depicted in FIG. 7, the flux barrier section 150 may include a second flux barrier opening 56 that creates a second pair of flux restriction webs 57. In FIG. 7 the second pair of flux restriction webs 57 are positioned radially inward relative to the flux restriction webs 51 (i.e., towards the mounting section 60). However, in other embodiments and depending upon the position of the first flux barrier opening 53, the second flux restriction webs 57 may be positioned radially outward relative to the flux restriction webs 51.

Figure 8:
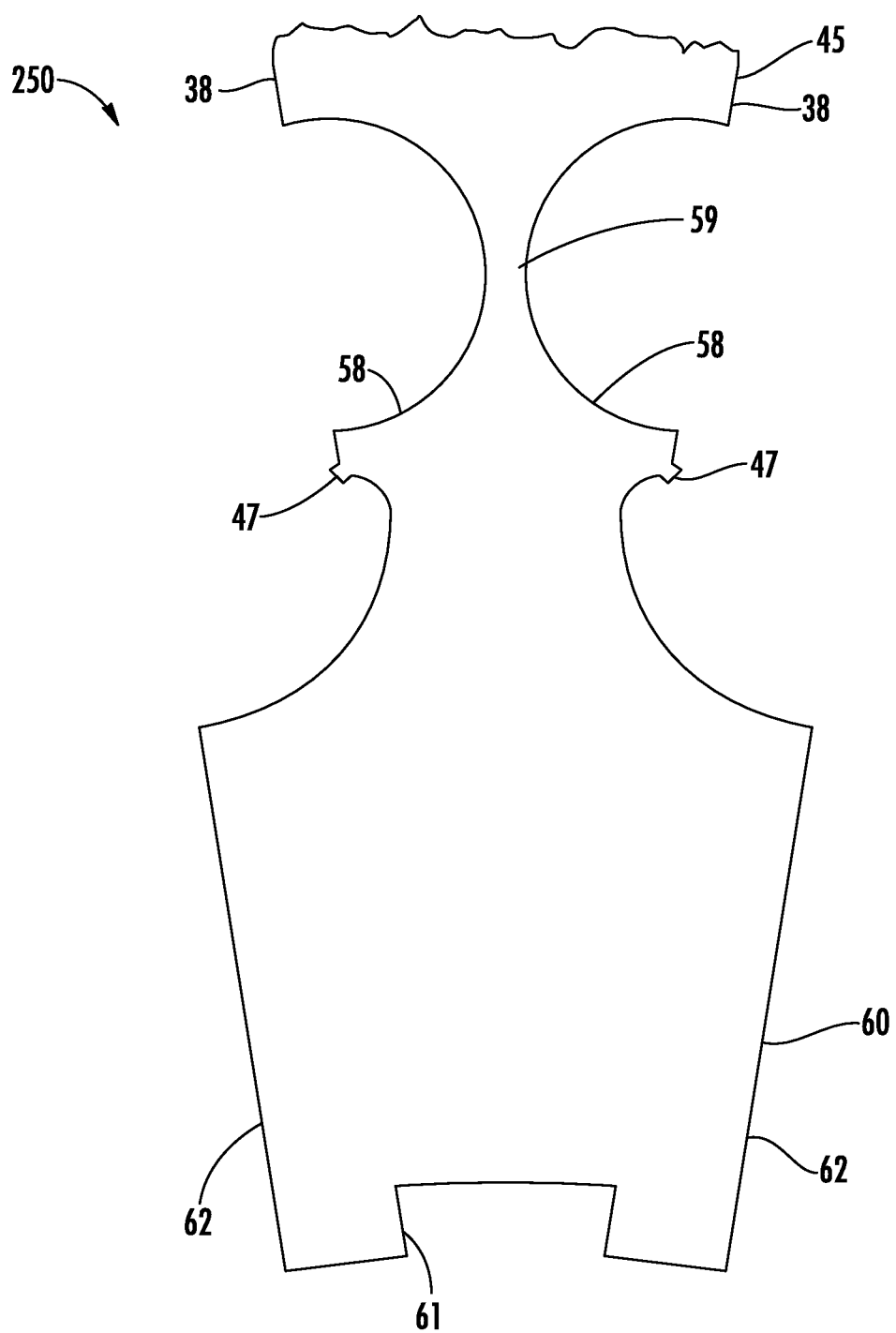
FIG. 8 is an enlarged fragmented end view of the radially inward end of still another alternate embodiment of a spoke.

In another embodiment, as depicted in FIG. 8, the flux barrier section 250 includes a pair of semi-circular openings 58 that intersect with the side edges 38 of the spoke 35 so that the flux barrier section includes only a single flux restriction web 59.

The range of widths of the second flux restriction webs 57 and the single flux restriction web 59 may correspond to the range of widths 52 of the flux restriction webs 51 described above.

The flux barrier opening 53 and the second flux barrier opening 56 are both depicted as being circular and the pair of openings 58 are depicted as being semi-circular. However, the openings 53, 56, 58 may have any desired configuration including oval, "peanut" shaped, or square.

The mounting section 60 of each spoke 35 is configured to secure the spoke to the hub 26. Accordingly, the radially inward end 36 of the mounting section 60 includes a locking member 61 configured to lockingly engage one of the locking members 29 of the hub 26. As depicted, the locking member 61 has a dovetail shaped recess configured to interact with or engage one of the dovetail projections 29 of the hub 26 to secure the spokes 35 to the hub 26. Other configurations are contemplated.

As depicted, the mounting section 60 of each spoke 35 is configured as a generally elongated trapezoidal cuboid that is widest at its radially outward end, where it engages or intersects with the flux barrier section 50. By configuring the mounting section 60 with a trapezoidal shape, the side edge or wall 62 of the mounting section of each spoke 35 may be supported to some extent by the side edges of the mounting sections of adjacent spokes. In other embodiments, the mounting section may have other shapes or configurations.

In one embodiment, each spoke 35 may be formed from a stack of a plurality of relatively thin layers of a magnetically conductive material such as silicon or electrical steel, in the form of sheet metal, that are laminated or otherwise secured together. Other configurations and constructions are contemplated. For example, in another embodiment, each thin layer of steel may be stamped with the hub 26 and all of the spokes 35 interconnected.

The magnets 70 are elongated and configured to be disposed within the magnet-receiving slots 75 of the rotor assembly 25. The magnets 70 are oriented so that the positive pole 71 of each magnet is aligned with or faces the positive pole of an adjacent magnet and the negative pole 72 of each magnet is aligned with or faces the negative pole of a different adjacent magnet. In other words, the outer edges 38 of half of the spokes 35 are engaged by the positive poles 71 of the magnets 70 while the outer edges of the other half of the spokes are engaged by the negative poles 72 of the magnets.

The magnets 70 may be any type of permanent magnet. In one embodiment, the magnets 70 may be ferrite magnets. In another embodiment, the magnets 70 may be rare earth magnets. Further, although depicted as generally rectangular cuboids, the magnets 70 may have any shape and may be formed of one or more individual magnets. Thus, references herein to a magnet may refer to a single magnet or a plurality of magnets adjacent each other but within the same slot 75. The slots 75 may thus be configured to closely match the configuration of the magnets 70 and, in some instances, to minimize air gaps between the sides of the magnets 70 and the side edges 38 of the spokes 35.

To manufacture the rotor assembly 25, in one embodiment, a plurality of spokes 35 are formed such as by stamping a plurality of sheet-metal components in the desired shape and stacking and securing together the individual sheet-metal components to form a laminated structure. The individual spokes 35 are then slid onto and secured to the hub 26. In doing so, the locking projections 29 of the hub are received within the locking recesses 61 of each spoke. Through such a configuration, a magnet-receiving slot 75 is formed between each pair of adjacent spokes 35. More specifically, the side edges 38 of adjacent spokes define the outer walls of each magnet-receiving slot 75.

In one embodiment, a magnet 70 is oriented in the desired orientation and inserted into each of the magnet-receiving slots 75 between the magnet alignment tabs 47 that extend from the side edges 38 of the spokes 25 into the slot. The assembly of the hub 26, the plurality of spokes 35, and the plurality of magnets 70 may then be further processed as desired. In one embodiment, the assembly may be potted with a nonconductive material such as a resin or epoxy. In another embodiment, the assembly may be enclosed with cast aluminum. In still another embodiment, no further processing may be performed. Upon completing the process of assembling the rotor assembly 25, the shaft 11 may be received and secured within the hub 26 of the rotor. Other manners of assembling the rotor assembly 25 are contemplated.

As described above, in another embodiment, the hub 26 and the spokes 35 may be interconnected and formed simultaneously during a stamping process. In such case, it will be unnecessary to slide the individual spokes 35 onto the hub 26. After stacking and securing together the layers of sheet metal that include both the hub 26 and the spokes 35, the magnets 70 may be inserted into the magnet-receiving slots 75 with the remainder of the assembly process continuing as described above.

Figure 9:
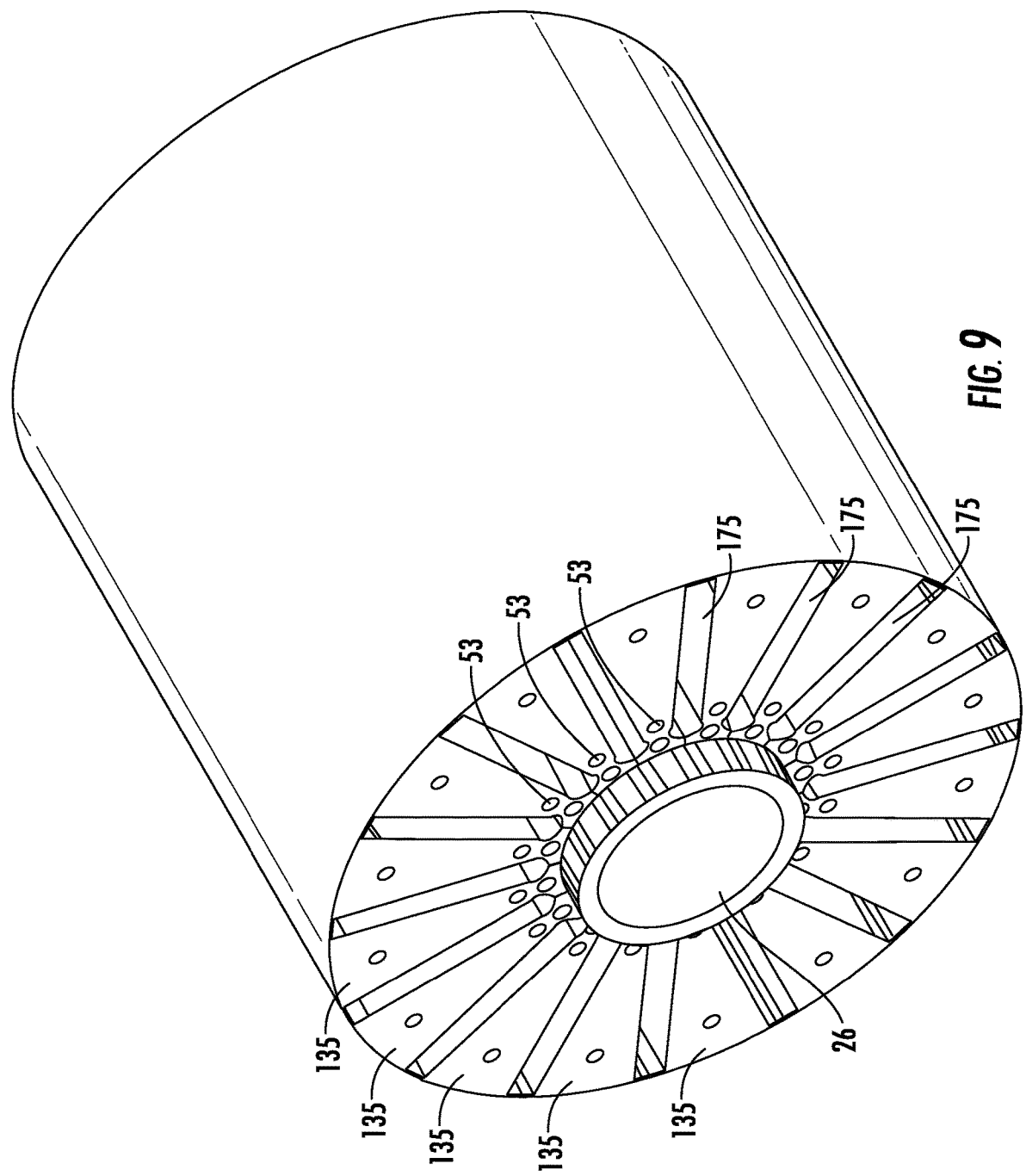
FIG. 9 is a perspective view of an alternate embodiment of a rotor assembly for use with the rotary electric machine of FIG. 1 but with the magnets removed for clarity.
Figure 10:
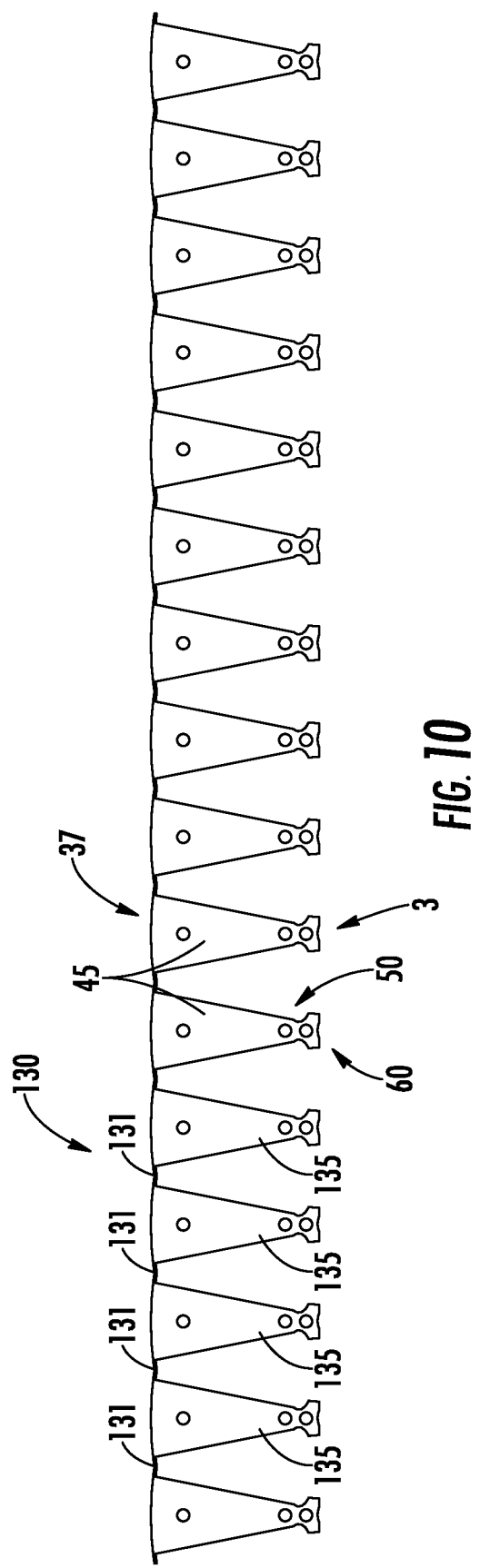
FIG. 10 is an end view of a chain of spokes for use in assembling the rotor assembly of FIG. 9.

In another embodiment depicted in FIGS. 9-10, the rotor assembly 125 may be formed from a chain 130 of spokes 135 that are interconnected by webs 131 along the radially outward end 37 of each spoke. Other than the outward radially end 37 and the addition of the second flux barrier opening 56, each spoke 135 may be configured identically or similarly to the spokes 35 described above and the description thereof is not repeated herein. More specifically, the rotor assembly 125 may be identical or similar to the rotor assembly 25 except that the spokes 135 include the second flux barrier opening 56 and the magnet-receiving slots 175 adjacent the radially outward end 37 of each spoke 135 are closed as a result of the webs 131.

In still another embodiment, the layers of metal forming the spokes may be formed from a helical stamping (not shown).

Figure 11:
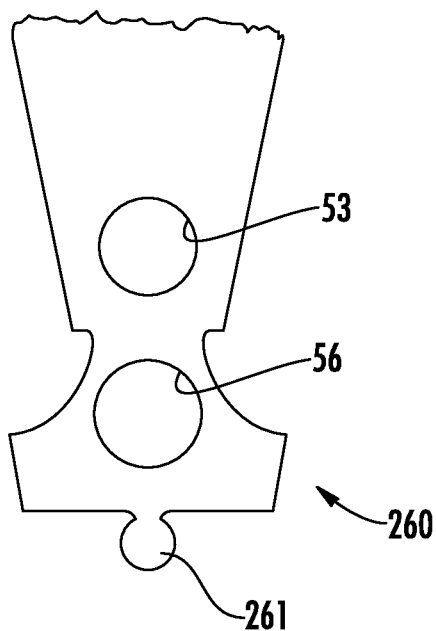
FIG. 11 is an enlarged fragmented end view of the radially inward end of a further alternate embodiment of a spoke.
Figure 12:
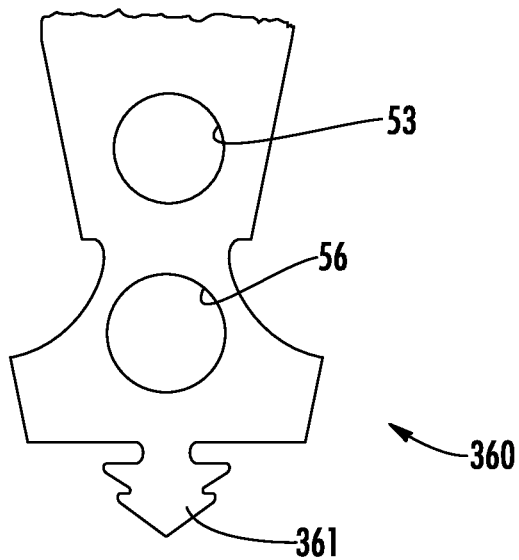
FIG. 12 is an enlarged fragmented end view of the radially inward end of still another further alternate embodiment of a spoke.

Referring to FIG. 11, an alternate configuration of the mounting section 260 is depicted. Rather than including a locking member 61 configured as a dovetail shaped opening (or any other shaped opening) as depicted in FIGS. 1-8, mounting section 260 is depicted with a circular projection 261. The hub (not shown) to be used with the mounting section 260 may be identical or similar to those described above but with a plurality of recesses configured to receive the circular projection 261 of each spoke. FIG. 12 depicts still another mounting section 360 having an alternate embodiment of a projection 361. The hub (not shown) to be used with the mounting section 360 may be identical or similar to those described above but with a plurality of recesses configured to receive the projection 361 of each spoke. To assemble the rotor 125, the spoke chain 130 is formed and then slid onto the hub 26. The magnets 70 are then inserted into the magnet-receiving slots 175 with the remainder of the assembly process continuing as described above.

The foregoing disclosure provides a rotary machine or motor 10 with numerous advantages. By providing a flux barrier section 50 having only relatively narrow webs 51, 57, 59 between two sections of the spoke 35, magnetic flux can be redirected as desired. More specifically, by disposing the flux barrier section 50 between the body section 45 of each spoke 35 and its mounting section 60, the only magnetically conductive connection between the body section and the mounting section is the flux restriction webs 51, 57, 59.

By configuring the flux restriction webs 51, 57, 59 as relatively narrow webs, they become saturated by magnetic flux during the operation of the motor 10. As a result of such saturation, significant amounts of additional flux cannot pass through the flux restriction webs and thus cannot pass from the body section 45 to the mounting section 60. By limiting the magnetic flux that can reach the mounting section 60, magnetically insulative materials are not required to prevent flux linkage between adjacent spokes 35 directly or through the hub 26. In other words, the foregoing configuration permits the hub 26 and spokes 35 to be formed of magnetically conductive material without the need for intervening or interposing magnetically insulative materials that operate to insulate or isolate adjacent poles of the rotor assembly 25. Such a configuration permits a less complicated and less costly structure without sacrificing performance or operating efficiencies.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context. Still further, the advantages described herein may not be applicable to all embodiments encompassed by the claims.

The invention claimed is:

1. A rotor assembly for a permanent magnet motor comprising:
    a rotor member, the rotor member having a hub with a central axis, a shaft integrally formed with the hub as a one-piece member, and a plurality of spokes extending radially outward relative to the hub, pairs of adjacent spokes defining a magnet-receiving slot therebetween, each spoke having a radially inward end and a radially outward end, the radially inward end being closer to the central axis than the radially outward end, each spoke having a body section, a mounting section, one or more magnet alignment tabs, and a flux barrier section, the body section extending from the radially outward end towards the radially inward end, the mounting section being interconnected to the one-piece member comprising the shaft and the hub, and the flux barrier section being disposed between the body section and the mounting section and having two flux barrier openings and two pairs of flux restriction webs extending between the body section and the mounting section, the two pairs of flux restriction webs being configured to magnetically isolate the body section from the mounting section, and one of the one or more magnet alignment tabs being positioned adjacent the flux barrier section, wherein the two flux barrier openings are disposed between and spaced from side edges of the spoke to define the two pairs of flux restriction webs, and wherein the two pairs of flux restriction webs are positioned on opposite sides of the magnet alignment tab that is positioned adjacent to the flux barrier section; and
    a plurality of permanent magnets, one of the plurality of permanent magnets being disposed within the magnet-receiving slot using the one or more magnet alignment tabs.

2. The rotor assembly of claim 1, wherein each of the spokes comprises a laminated array of planar elements interconnected together to define a thickness of the spoke.

3. The rotor assembly of claim 1, wherein the only magnetic connection between the body section and the mounting section is the two pairs of flux restriction webs.

4. The rotor assembly of claim 1, wherein each of the plurality of spokes is secured to the hub.

5. The rotor assembly of claim 4, wherein the hub has a plurality of first locking members and each of the plurality of spokes having a second locking member, each first locking member interacting with one of the second locking members to secure the plurality of spokes to the hub.

6. The rotor assembly of claim 5, wherein the first and second locking members comprise interengaging dovetails.

7. The rotor assembly of claim 4, wherein the hub is made from a first material and each of the plurality of spokes is made from a second material, different from the first material.

8. The rotor assembly of claim 4, wherein the hub is made of a magnetically conductive material and each of the plurality of spokes is directly secured to the hub.

9. The rotor assembly of claim 4, wherein the hub is integrally formed with the plurality of spokes.

10. The rotor assembly of claim 1, wherein each of the plurality of spokes has a pair of oppositely facing side edges extending radially outward relative to the shaft, the side edges of adjacent spokes defining edges of the magnet-receiving slots.

11. The rotor assembly of claim 1, wherein each flux barrier opening is circular.

12. The rotor assembly of claim 1, wherein each pair of adjacent spokes defining the magnet-receiving slot therebetween are circumferentially sequential.

13. The rotor assembly of claim 1, wherein each of the two pairs of flux restriction webs has a lateral width no greater than 4 mm perpendicular to the thickness of the spokes.

14. The rotor assembly of claim 1, where each of the hub and plurality of spokes is formed of a magnetically conductive material.

15. The rotor assembly of claim 1, wherein the one or more magnet alignment tabs comprise a first magnet alignment tab and a second magnet alignment tab, wherein the first magnet alignment tab is positioned adjacent to the flux barrier section and the second magnet alignment tab is positioned adjacent to the radially outward end of the spoke.

16. The rotor assembly of claim 15, wherein the only magnetic connection between the body section and the mounting section is the flux restriction web.

17. The rotor assembly of claim 1, wherein the plurality of spokes are interconnected by webs along the radially outward end of each spoke so as to form a chain of spokes.

18. A motor, comprising:
    a stator assembly;
    a rotor assembly disposed within and configured to rotate relative to the stator assembly, the rotor assembly including a rotor member, the rotor member having a hub with a central axis, a shaft integrally formed with the hub as a one-piece member, and a plurality of spokes extending radially outward relative to the hub, pairs of adjacent spokes defining a magnet-receiving slot therebetween, each spoke having a radially inward end and a radially outward end, the radially inward end being closer to the central axis than the radially outward end, each spoke having a body section, a mounting section, one or more magnet alignment tabs, and a flux barrier section, the body section extending from the radially outward end towards the radially inward end, the mounting section being interconnected to the one-piece member comprising the shaft and the hub, and the flux barrier section being disposed between the body section and the mounting section and having two flux barrier openings and two pairs of flux restriction webs extending between the body section and the mounting section, the two pairs of flux restriction webs being configured to magnetically isolate the body section from the mounting section, one of the one or more magnet alignment tabs being positioned adjacent the flux barrier section, and a plurality of permanent magnets, one of the plurality of permanent magnets being disposed within the magnet-receiving slot using the one or more magnet alignment tabs, wherein the two flux barrier openings are disposed between and spaced from side edges of the spoke to define the two pairs of flux restriction webs, and wherein the two pairs of flux restriction webs are positioned on opposite sides of the magnet alignment tab that is positioned adjacent to the flux barrier section; and a shaft mounted on and extending through the hub.

\* \* \* \* \*